(12) United States Patent
Hughes

(10) Patent No.: US 8,091,510 B2
(45) Date of Patent: Jan. 10, 2012

(54) COMPACT CULTURE SYSTEMS

(76) Inventor: Kenneth D. Hughes, Alpharetta, GA (US)

( * ) Notice: Subject to any disclaimer, the term of this patent is extended or adjusted under 35 U.S.C. 154(b) by 0 days.

(21) Appl. No.: 12/701,308

(22) Filed: Feb. 5, 2010

(65) Prior Publication Data

US 2010/0218727 A1 Sep. 2, 2010

Related U.S. Application Data

(63) Continuation of application No. 11/432,259, filed on May 11, 2006, now abandoned.

(60) Provisional application No. 60/682,243, filed on May 18, 2005.

(51) Int. Cl.
*A01K 61/00* (2006.01)
(52) U.S. Cl. ....................................................... 119/200
(58) Field of Classification Search ................... 119/206, 119/6.5, 6.6, 6.7, 200; 206/221, 219
See application file for complete search history.

(56) References Cited

U.S. PATENT DOCUMENTS

| | | | | |
|---|---|---|---|---|
| 3,565,041 | A | * | 2/1971 | Brooks ........................ 119/203 |
| 4,116,352 | A | * | 9/1978 | Davis ........................... 215/270 |
| 4,324,200 | A | * | 4/1982 | Johnson ....................... 119/200 |
| 4,952,068 | A | * | 8/1990 | Flint ............................ 366/337 |
| 4,982,697 | A | * | 1/1991 | Neff ............................. 119/200 |
| RE34,545 | E | * | 2/1994 | Kroeker ........................ 119/6.7 |
| 5,865,141 | A | * | 2/1999 | Poynter et al. .............. 119/246 |
| 6,029,605 | A | * | 2/2000 | Licata .......................... 119/246 |
| 6,105,535 | A | * | 8/2000 | Atamian et al. .............. 119/6.5 |
| 6,517,856 | B1 | * | 2/2003 | Roe et al. .................... 424/410 |
| 2002/0079286 | A1 | * | 6/2002 | Haynes et al. ............... 215/276 |
| 2004/0226363 | A1 | * | 11/2004 | Rait .............................. 73/295 |

* cited by examiner

*Primary Examiner* — Tien Dinh
*Assistant Examiner* — Valentina Xavier
(74) *Attorney, Agent, or Firm* — Johnson & Associates

(57) ABSTRACT

Devices and methods are disclosed for the containment, hatching, and culture of aquatic and semi-aquatic organisms. Methods and device can be applied widely in the care and culture of aquatic and semi-aquatic organisms important in the aquaculture industry, aquarium and pet hobby, science instruction and education, environmental screening and toxicity testing, and the education-entertainment field.

16 Claims, 8 Drawing Sheets

3A.

3B.

COMPACT CULTURE SYSTEMS

CROSS-REFERENCE TO RELATED APPLICATION

This application is a continuation of and claims priority under 35 U.S.C. §120 to U.S. application Ser. No. 11/432,259 filed May 11, 2006, now abandoned entitled "Compact Culture Systems,"which claims priority to and the benefit of the filing date of U.S. provisional application Ser. No. 60/682,243, entitled "Compact Culture Systems" filed on May 18, 2005. The above-identified applications are hereby fully incorporated herein by reference.

FIELD OF THE INVENTION

The herein disclosed invention is directed at methods and devices for the containment, manipulation, hatching, and culture of aquatic and semi-aquatic organisms. Devices of the invention provide efficient, convenient and inexpensive methods for hatching and culturing aquatic organisms. Devices and methods are beneficial to a wide variety of applications including aquaculture, the aquarium hobby, environmental sensing and toxicity testing, and for educational-entertainment purposes.

BACKGROUND OF THE INVENTION

Small aquatic organisms are used on a routine basis for education, entertainment, environmental testing, and as food for larger aquatic and semi-aquatic organisms, such as, marine animals and fish, freshwater animals and fish, brackish water animals and fish, freshwater and marine invertebrates, salamanders, lizards, turtles, newts, and frogs. Small aquatic organisms can be obtained by hatching resting eggs or cysts, reviving dormant and low activity forms of organisms, by propagating organisms in a culture solution, or combinations thereof.

Culture systems suitable for hatching, propagating, or growing aquatic organisms vary widely and are highly dependent upon the species and size of organism and the final anticipated use of the organism. The culture of aquatic organisms requires careful attention to chemical and physical parameters including the regulation of light, temperature, nutrients, wastes, buffers, salinities, and organism densities.

Standard practices involving the large scale culture of aquatic organisms often includes the use of transparent tanks or shallow pond systems, where light penetration can be maximized. Additionally, many culture systems involve aeration to control gases such as oxygen, ammonia, and carbon dioxide, to provide mixing, and to suspend non-soluble culture components including organisms.

Large scale culture of aquatic organisms in open and closed systems has been conducted for many years with varying degrees of success. Procedures and protocols are often complicated, time consuming, and require substantial experience to understand. Unfortunately, no level of experience guarantees the elimination of culture crashes of the primary organism or feed organisms. As a result, cultures require restarting and reviving. In many critical operations both backup and redundant systems must be established.

Live aquatic foods are ideally suited for pet and aquarium hobbyists which maintain marine, fresh, or brackish water systems on a small scale. Live foods promote health, reproductive vigor, and long lives in aquarium pets. When used correctly live foods also reduce aquarium and system maintenance. In the case of some wild-caught organisms, only live foods allow these organisms to be maintained in captivity. Additionally, fry and other immature organisms often feed only on live foods in the early stages of their development. Unfortunately, scaled down culture systems suitable for home use are, complicated, difficult to control, time consuming to set-up, and inconvenient for many hobbyists. As a result, foods of lower quality such as flake foods are used to the detriment of the pet or newly hatched offspring, and to the aquatic pet experience in general.

The culture of small aquatic organisms for educational purposes has been widely discussed and promoted in educational institutions at all levels. Unfortunately, the time consuming and inconvenient nature of such activities has reduced the use of such instructional systems at many institutions.

The instant invention discloses compact devices, materials, and methods for safely, simply, inexpensively, and efficiently, containing and culturing aquatic organisms for use in aquaculture, the pet and aquarium hobby, environmental sensing and toxicity testing, and for education and education-entertainment purposes. Batch, continuous, and semi-continuous culture methods are supported by devices of the invention.

DESCRIPTION OF RELATED ART

Live foods are invaluable for maintaining the health of aquatic and semi-aquatic organisms as well as rearing the offspring of many aquatic organisms. In caring for some wild collected aquatic organisms, only live foods allow the animals to be maintained in captivity.

Devices suitable for the batch, continuous and semi-continuous culture of aquatic organisms for use as food stuffs are commercially available for both large scale and small scale operations. Hatching, propagation, and culture of many aquatic and semi-aquatic species have been successfully completed in containers of all shapes and sizes and many methods have been disseminated through Industry literature. Frequently, in the aquaculture industry large volume tanks and vessels are used. Materials used for vessels include a variety of rigid plastic containers, plastic bags, and coated solid substrates, such as wood. Since many organism culture procedures require the presence of light, containment systems are often shallow, transparent, or a combination thereof.

Devices for the batch, continuous and semi-continuous culture of small aquatic organisms in the home, have been described and widely disseminated in the print media. Many of these do-it-yourself methods incorporate rigid household containers such as those that previously held consumer beverages. Most of these containers require careful modification involving cutting, drilling, and sealing. Commercial devices for the culture and hatching of organisms in the home are available in several rigid plastic or glass forms. As is the case with large scale operations, in-home culture of aquatic organisms as a food source requires strict adherence to cleaning, sanitizing, and culture procedures, for successful results.

There is a continuing need for compact, convenient, and inexpensive devices and methods for their use, for the batch, continuous, and semi-continuous, culture of small aquatic organisms in the home, in the field, in laboratory settings, and in commercial aquaculture operations. More specifically, there is a significant need for devices and methods suitable for aquatic pet owners, aquarium hobbyists, and aquatic system caretakers with limited laboratory and aquaculture experience.

SUMMARY OF THE INVENTION

The instant invention involves the hatching, culture, and propagation of aquatic organisms in devices that incorporate integrated storage, mixing, illumination and aeration compartments. Preferred devices are compact, flexible, incorporate one or more conical shaped compartments, and provide one or more illumination windows created with transparent, reflective, or a combination of different polymer films.

Devices of the invention are suitable for hatching organisms from resting eggs or cysts such as brine shrimp (artemia) as well as propagating organisms such as rotifers, triops, daphnia, copepods, worms, nematodes, protozoa, infusoria, bacteria, and algae.

Devices of the invention are designed to be used with widely available and inexpensive aeration and lighting equipment. Exemplary devices include small aquarium air-pumps and desk lamps.

Exemplary devices of the invention incorporate printed instructions, culture indicators, and procedural convenience markings directly on the device surface or indirectly through the use of pre-printed labels.

Devices of the invention can be supported in an upright position with transparent containers, such as drinking glasses, or be free standing using multifunctional molded components as a support mechanism. Devices may be sealed and resealed with external components such as pressure clips or restrictive bands in order to place the device in a horizontal position without leakage of liquid and system components.

Preferred devices are described in two forms. The first form, are devices that include all components required for hatching, culture, propagation of organisms or a combination thereof. Devices containing all hatching and culture system components initially isolate and separate components using pressure sensitive barriers generated with device film components or with external components such as restrictive bands and pressure generating clips which yield liquid tight seals. Exemplary devices can be single use and disposable or recyclable, or multi-use allowing repeated cleaning, sanitizing, and reuse.

The second form, are devices that include some but not all of the hatching and culture components. These devices require the addition of one or more hatching, culture, or propagation components by the device operator. Devices containing some of the hatching and culture system components initially isolate and separate components using pressure sensitive barriers generated with device film components or with external components such as restrictive bands and pressure generating clips which yield liquid tight seals. Exemplary devices can be single use and disposable or recyclable, or multi-use allowing repeated cleaning, sanitizing, and reuse.

The utility of the instant invention is far reaching and provides significant benefits that have not been previously described in the field of commercial aquaculture, the hobbyist literature directed at the feeding and care of residential aquaria, the field of environmental sensing and testing, the field of science and health education, and the field of education-entertainment products.

It is therefore an object of this invention to provide flexible conical shaped devices and methods for their use in order to hatch and propagate organisms from resting eggs or cysts. Preferred organisms include brine shrimp, triops, rotifers, worms, and the like.

It is an object of this invention to culture marine, fresh, and brackish water algae species in flexible conical devices of the invention.

It is an object of this invention to propagate brine shrimp, rotifers, daphnia, copepods, worms, nematodes, protozoa, infusoria, and related organisms that are valuable food sources for early stage aquatic and semi-aquatic organisms.

It is a further object of this invention to provide devices which facilitate washing, rinsing, cleaning, and conditioning organisms from components residing in culture solutions and to prepare them for further use.

It is another object of this invention to provide a device for completing chemical and biological treatments and procedures on organisms. Exemplary procedures include decapsulating brine shrimp cysts.

It is an object of this invention to provide devices, materials, and methods for bio-enriching, feeding, conditioning, or a combination thereof, aquatic organisms before they are used as a feed.

It is an object of this invention to provide devices and materials for delivery of the cultured or hatched organisms in a controlled and quantitative manner.

It is an object of this invention to provide a device for storage of hatched or cultured organisms in a refrigerator or freezer.

It is an object of this invention to provide a device suitable for both obtaining live organisms and preparing fresh or frozen pet foods.

It is an object of this invention to provide devices incorporating conical shaped compartments for the efficient suspension, mixing, and distribution of organisms in a hatching, culture, or sustenance solutions.

It is an object of this invention to provide a single device that allows for the initial storage of hatching culture, propagation or combinations thereof system components and subsequent mixing and culture of aquatic organisms.

It is an object of this invention to provide a device that incorporates visual indicators for determining the density of organisms, device volume, light intensity level, and temperature.

It is also an object of this invention to provide a device that can be positioned vertically or horizontally, and that can by hung from strings, lanyards, and the like.

It is also an object of this invention to provide a device that is free standing with a dispenser for reproducible delivery of system components.

DETAILED DISCUSSION

Figure 1:
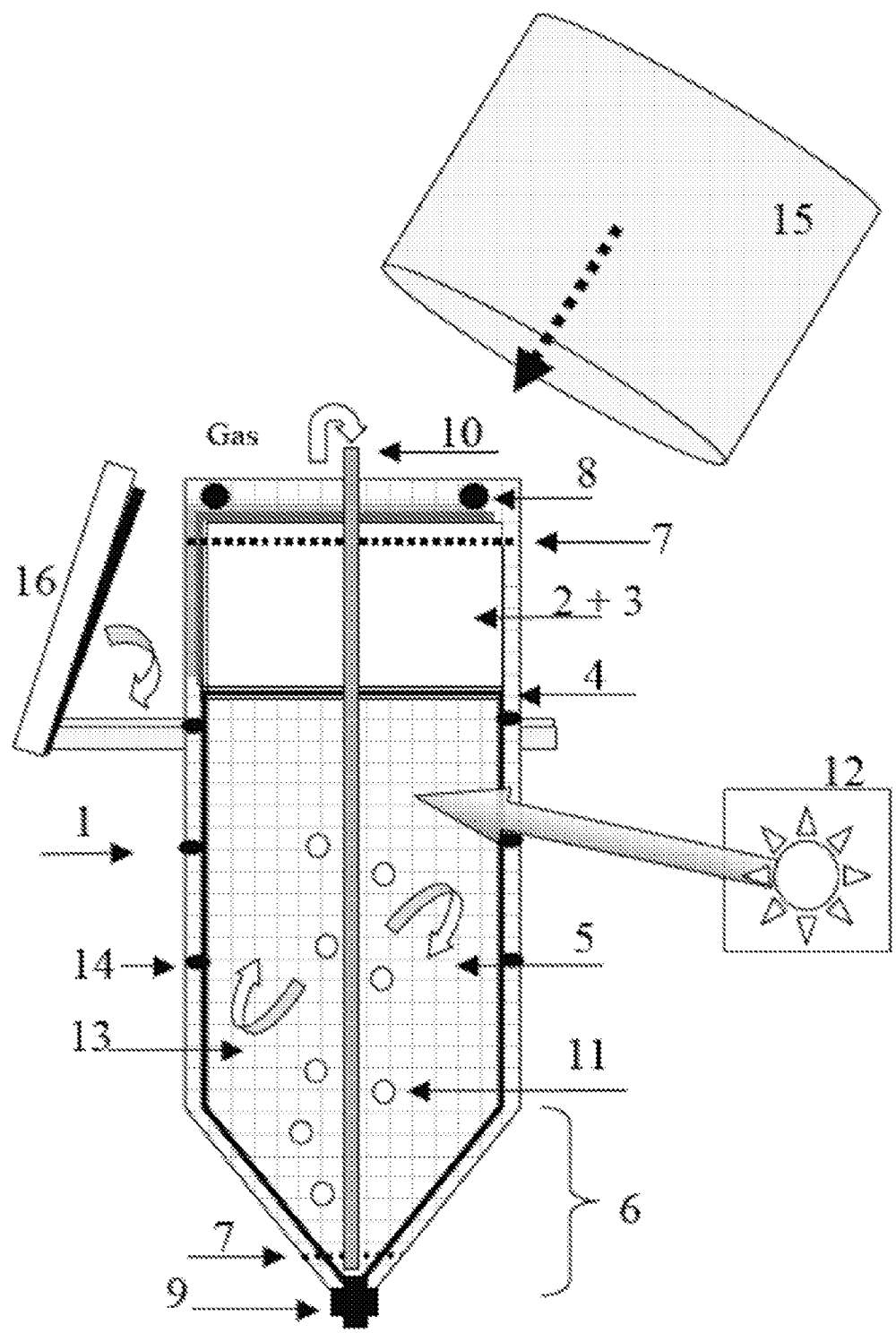
FIG. 1, a front view, illustrates one embodiment of the invention, a device made from transparent materials, incorporating three hatching-culture system storage compartments, and one mixing and illumination compartment, which is formed when pressure sensitive barriers are breached. External light source (12) provides illumination through the transparent window of device (1). Light blocking sheath (15) fits over the device and pressure clip (16) is used to provide a liquid tight seal anywhere across the device. The device is prepared using three laminated polymer sheets.

The disclosed invention involves the hatching, propagation, culture or combination thereof of aquatic and semi-aquatic organisms in conical shaped devices. Preferred devices are compact, flexible, and incorporate compartments suitable for storage of culture and hatching system components, mixing of components, and subsequent efficient aeration and illumination of system components. Preferred devices are described in two forms; devices which contain all chemical and biological components for hatching or culturing organisms, and devices which contain some but not all chemical and biological components for hatching, culture, propagation, or a combination thereof. Preferred devices isolate and separate components using pressure sensitive barriers created with thin polymer films incorporated directly into the devices, utilizing external clips or restrictive bands that provide liquid tight seals, or a combination thereof. Exemplary devices can be prepared using plastic molding techniques as well as thermal sealing of rolled sheet film stock.

Exemplary devices of the invention facilitate simple clean-up, washing, and bioenrichment of hatched or cultured organisms before use as a food source.

Preferred devices facilitate efficient use of simple, inexpensive aeration and lighting equipment, and work efficiently with support vessels such as drinking glasses and light control materials such as opaque woven and nonwoven materials.

Preferred devices can optionally include molded dispensing components such as caps and lids which serve multiple purposes including support for devices in an upright free standing manner and quantitative delivery of device contents. Exemplary devices of the invention facilitate low temperature storage after culture, hatching, propagation, or any combination thereof. Preferred devices can utilize re-sealable molded caps and closures directly integrated into the devices or applied to devices in an external manner. Preferred resealing mechanisms whether integrated directly into devices or applied external to the device yield liquid tight closures.

Preferred devices are stable in the presence of water and aqueous solutions as well as agents used to clean and condition plastic devices. Exemplary agents include oxidizing and reducing agents.

Exemplary devices incorporate printing directly on the surface of devices or indirectly through the application of pre-printed labels. Printing is useful for marketing and sale of individual devices and device multi-packs, for providing instructions for device use, and for providing procedural convenience markings. Exemplary markings include volumetric indicators, locations for device opening and resealing, and positioning. Highly useful device markings also include culture system indicators which provide information concerning changes in organism density, chemical concentration changes, temperature changes, light intensity levels and culture or hatching progression.

Preferred devices are in the form of compact, flexible packages incorporating compartments or chambers specialized for different functions. Compartments are designed for secure dry storage of cysts, resting eggs, dormant or reduced activity organisms, chemical reagents in solid or liquid form for hatching, culturing, or propagating organisms, compartments for mixing and suspending organisms, and compartments optimized for illuminating and maintaining constant device temperature, and separating post-hatch or post culture components.

Additional device design elements include those that facilitate opening the device, sealing the device, delivering device contents in a quantitative manner, adding reagents in a quantitative manner, mounting or positioning the device through adhesive or locking mechanisms, hanging devices from string, wires, lanyards, and the like, and supporting the device in a free standing manner.

Exemplary materials for device fabrication include thin flexible films of food or cosmetic quality. Polymer films may be manufactured in single component, mixed component, and complex laminate forms.

Preferred device designs include those with one or more conical shaped elements, compartments, or a combination thereof. Exemplary devices include the use of molded parts for supporting devices in a free standing manner, and facilitating controlled or precise delivery of device contents. Exemplary materials for device manufacture include rolled sheet films that may be used on demand, and with high speed, automated equipment. Automated filling of devices with components of the hatching, propagation, and culture system is beneficial for controlling device costs.

Many different types of solutions may be used with devices of the invention before, during, and after the culture, hatching, or propagation activity. Exemplary solutions include, sanitizing, sterilizing, and oxidizing solutions, reducing solutions, dilution and wash solutions, waste neutralizing solutions, and bioenrichment or food containing solutions that increase the nutritional value of the cultured organisms as a food source.

Additional exemplary solutions include, water, aqueous solutions, solutions containing polar solvents, solutions containing dissolved and suspended species, nutrient solutions containing inorganic, organic and combinations thereof components, and solutions containing emulsions incorporating a wide range of chemical and biological agents, such as fatty acids, vitamins, pharmaceuticals, and vaccines. In general, many nutritional and medicinal agents may be incorporated into aquatic organisms for the sole purpose of transferring these agents into other organisms.

Exemplary organisms that can be hatched, propagated, or cultured include, brine shrimp, daphnia, moina, rotifers, triops, copepods, insect larvae, worms, nematodes, invertebrates, bacteria, molds, algae, protozoa, ciliates, infusoria, and combinations thereof. These organisms and others include species obtained from marine, fresh or brackish water systems.

Industrial Applicability and General Embodiments

The disclosed invention facilitates the simple, convenient, and economical hatching, propagation, culture, or combination thereof, of aquatic and semi-aquatic organisms. These organisms may be used by themselves as aquatic pets, for the maintenance of aquatic and semi-aquatic pet health, for rearing and propagating aquatic and semi-aquatic organisms, for science education in understanding biology, exploring the role of chemicals in the environment, in health education to monitor the effects of drugs and chemicals on an organism's systems, as environmental sensors for toxicity and pollutant monitoring, and as a food source for other organisms, or any combination thereof. In addition, devices and methods will find utility in commercial aquaculture as a method of starting large scale cultures.

The disclosed invention may be used to generate a wide range of different consumer and industrial, products which provide significant utility. As example, a compact, inexpensive, one time use device can be prepared and utilized to efficiently complete all of the following operations: storage of dormant or reduced activity forms of aquatic organisms, storage of solid and liquid reagents required for the hatching, culture and propagation of aquatic organisms, the mixing of culture or hatching solutions with organisms, the efficient suspension of organisms in the culture or hatching solution, the aeration and illumination of organisms, the isolation and separation of organisms from unwanted solids and liquids in the hatching and culture solution, the washing, feeding, and bioenrichment of the hatched or cultured organisms, the long term storage of hatched or cultured organisms, and the controlled delivery of these organisms from one vessel to another. Exemplary organisms appropriate for the above described system include brine shrimp (artemia), invertebrates, daphnia, moina, copepods, worms, insect larvae, bacteria, mold, algae, protozoa, infusoria, and combinations thereof.

General embodiments include use of devices that are compact, made with flexible thin polymer films, and which contain one or more conical shaped compartments. General embodiments include devices that are completely self-contained, incorporating all components required to hatch, culture, and propagate small aquatic organisms. General embodiments also include devices that contain some but not all of the components required to hatch, culture, and propagate aquatic organisms.

General embodiments include devices that isolate and separate the culture system components in specialized compartments that are created with integrated pressure sensitive barriers. General embodiments include the use of integrated pressure sensitive barriers created with thermal or adhesive processing of device films. General embodiments include the use of external pressure clips and restrictive bands which yield liquid tight seals to form specialized compartments or to assist in manipulating device contents.

General embodiments include the hatching and culture of single cell as well as multicell organisms. General embodiments include devices that function with common aeration, heating, and lighting equipment as well as simple light blocking materials, and support structures. General embodiments include devices that are free standing.

General embodiments involve the fabrication of devices for the field of aquaculture, the aquarium hobby, the care and maintenance of aquatic and semi-aquatic organisms, and science education.

General embodiments include the fabrication and design of devices for use in sensing and which facilitate the hatching and culture and subsequent analysis of organisms useful in evaluating chemicals in environmental samples.

General embodiments include the printing and marking of devices in a manner that enhances the marketing and aesthetics of using the devices.

General embodiments further include the printing and marking of devices in a manner that increases the operational utility and convenience of using and manipulating devices of the invention.

General embodiments include devices which are inexpensive and minimize impact on the environment when needing disposal, through the minimization of raw materials and use of recyclable materials. General embodiments include devices that are made on demand from rolled thin polymer film stocks.

BENEFICIAL CHARACTERISTICS OF THE INVENTION

Devices and methods of the invention greatly increase the success of hatching and culturing aquatic and semi-aquatic organisms. Increased success is a direct result of removing the complexities of obtaining appropriate culture materials, eliminating the need to calculate required concentrations and dilutions, and eliminating the need to accurately transfer quantitative masses and volumes.

Elimination of the many preparatory steps required for the hatching, culture, propagation, and combinations thereof, of live organisms greatly decreases the time and effort required to obtain living aquatic and semi-aquatic organisms for the purposes defined herein, as well as others.

Increased simplicity and convenience allows aquatic organisms to be hatched, propagated, and cultured by a wider variety of non-experienced individuals and in a greater number of locations and situations.

Devices of the invention provide a simple and efficient means of isolating and separating hatched and cultured organisms from culture components and subsequently cleaning and rinsing organisms of culture components. Single use devices and methods of the invention provide a simple and straightforward method for eliminating the need to clean, sanitize, and neutralize apparatus used for the hatching and culturing organisms. Further single use devices and associated methods of the invention greatly reduce the transfer of disease and contaminants between culture systems and target application systems by providing a compact clean device for each culture and hatching task. Devices of the invention are inexpensive and can be made with recyclable components.

Further devices and methods of the invention allow the fresh hatching and culture of appropriate amounts of short lived organisms for many small to medium applications. This reduces waste associated with the preparation of excessive quantities of food stuffs and decreases costs. This is important as newly cultured, hatched, or propagated organisms are usually of greater nutritional value than older organisms that have not undergone a bio-enrichment procedure. Additionally, newly hatched organisms can provide greater movement which is beneficial in eliciting feeding responses.

Furthermore, devices and methods of the invention allow convenient and efficient storage of hatched or culture organisms in reduced temperature environments such as refrigerators and freezers, in the same device. Devices and methods also allow hatched and cultured organisms to be directly formulated into complex fresh feeds or frozen foods directly in the same container.

PREPARATION OF MATERIALS AND DEVICES OF THE INVENTION

There are many methods of practicing the disclosed invention. In general, an enclosed system or package creates the device which is formed with polymer components, films, sheets, molded plastic components, or a combination thereof. Device designs typically utilize multiple film types, laminated film components, and substrate coatings which facilitate control of liquid and gas properties, hatching, propagation, and culture system parameters, and printing.

Hatching, propagation and culture system components, in solid or liquid form are contained in individual specialized compartments of the enclosed devices. Devices are designed to incorporate compartments of varying size and depend upon the amounts of components required for hatching, propagation, or culture, as well as the aeration, mixing, suspension, and volume needs of the organism or organisms present. Compartments are designed to communicate with at least one pressure sensitive barrier generated internal to the device, or created with the application of an external device such as a pressure clip or restrictive band. Pressure sensitive barriers when breached, or removed allow dissolution, dilution, mixing, suspension, illumination or combination thereof inside the sealed device.

Opening the device by removal of a peripheral seal through cutting or tearing allows additional components to be added such as solutions, solids, organisms, as well as aeration equipment, such as air tubes and air lines for mixing, gas exchange, and suspension of components. Devices can incorporate re-sealable components integrated directly into the device, or through application of externally applied restrictive bands or pressure clips. Both methods are used frequently in consumer food and beverage packaging.

Hatching, propagation, and culture components can include both chemical and biological species in the form of solids, liquid, and liquids containing gases. Liquids for hatching and culture may range widely in viscosity and can incorporate a variety of inorganic, organic, dissolved and suspended materials and combinations thereof. In many cases, both physical and chemical changes occur in the device solution as hatching, propagation, or culture proceeds.

In general, at least one mixing or storage compartment or combination thereof, is present. This compartment can be initially present as a separate compartment or formed through the combination of two or more compartments. One or more compartments may also be unattached and mobile inside the larger device. Compartments can be formed with integrated seals which are permanent, temporary, or combinations thereof as well as with externally applied restrictive bands and pressure clips. Culture system component storage, mixing, aeration, and illumination compartments can be designed in a wide variety of spatial orientations including in series, in parallel, and in combinations thereof.

Device Shape

Preferred devices of the invention have conical shaped aeration, mixing, and illumination compartments. Conical shaped compartments provide an optimal geometry for eliminating dead-spots and keeping system components that readily settle to the bottom of containers mixed and suspended. Simple aeration, mixing, and suspension can be achieved using small inexpensive air-pumps and bubble releasing materials. Further conical shaped devices simplify the collection and separation of system components, including organisms, once aeration and mixing is stopped.

Conical shaped compartments and devices are easily generated by appropriate cutting and sealing of thin polymer films and sheets or by molding thin polymer tubes and hybrid bottles in the desired shape. Preferred device designs of the invention include those which are flexible and facilitate the generation of integrated pressure sensitive seals or barriers and allow external pressure clips and restrictive bands to be used for the same purpose. Each of these methods can yield liquid tight seals which are temporary and controlled by the device operator.

Exemplary device designs are disclosed in FIGS. 1-8 and include thin film devices of different shapes and sizes, devices incorporating molded plastic components which are resealable as well as external auxiliary components, which are used to manipulate devices. Those knowledgeable in the field will recognize the wide design parameters that are available while maintaining the principles disclosed herein. As example, a device of the invention in the geometry of a square can obtain a conical hatching, mixing, and aeration compartment by rotating and mounting the device appropriately. Likewise, molded components can allow devices of the invention to be simultaneously free-standing and flexible. Devices can be of various sizes and volumes. Preferred devices have volumes between 5 $cm^3$ and 1000 $cm^3$. More preferred devices have volumes between 10 $cm^3$ and 500 $cm^3$.

Hatching and culture components contained in device compartments can be moved between device compartments using externally applied pressures when desired, by the operator. External pressurization of devices may be accomplished directly through use of the operator's hands, or indirectly through the use of mechanical plungers, squeezing equipment, and the like. Those experienced in the art will understand that movement of some device components between compartments can lead to chemical reactions which increase device pressures internal to the device and result in breach of additional pressure sensitive barriers and further movement of components between compartments.

Pressure sensitive barriers integrated directly into devices are created using chemical or physical mechanisms or combinations thereof. Exemplary mechanisms include thermal treatment of laminated films and the use of adhesives. Exemplary mechanisms include temporary barriers known as peelable seals.

Devices of the invention allow storage of organisms at room temperature, in refrigerated systems, and at temperatures below the freezing point of water.

A wide variety of static mixing elements can be included in series, in parallel, or a combination thereof, inside devices of the invention. Mixing compartments may utilize obstacles and impermeable objects which direct material flow characteristics.

Exemplary materials used to prepare devices of the invention include, thermoplastic elastomers such as polystyrene-dienes, polyurethanes, copolyester-ethers; PVDC, OPP, EVOH, nylon, EVA, EAA, EMA, LLDPE, VLDPE, ULDPE, ionomers, metallocenes, PP, PCTFE, ECTFE, PET/PETG, as well as laminates and blends of materials including Bynel, Crystar, Dartek, Elvaloy, Delrin, polyethers of formaldehyde/ethylenoxide, polyethylene, polystyrenes, polyvinyl chlorides, ionomers, polyethylene terephthalates, polyvinyl acetates, polycarbonates, polyamides, polyvinyl alcohols, polyvinylidene chlorides, ethylene acrylate copolymers including butyl-, ethyl- and methyl-acrylates (EBAs, EEAs and EMAs), nylons, celluloses, polypropylenes, polybutadienes and polyisoprenes, polyvinylchorides, propanediols, fluorinated polymers including Teflon, polyesters, Tyvek, and tyvek-type materials, Gore-Tex and Gore-Tex type materials, foil based films, clear foil laminations, and metallized polyester-polyethylene laminations. Films can include clay coated papers and laminations. Many of these polymer systems can be prepared in flexible as well as rigid forms. Those experienced in the art will understand how this is accomplished for the intended purposes of each device component. Further experts in the field will understand how to match and mate flexible and rigid components for purposes of preparing devices of the invention and practicing the invention. An exemplary practice is the insertion of plastic zipper and slide seals which allow repeat opening and closing of thin film sheets.

Many of the above listed materials are used in some form in commercially available consumer food, beverage, cosmetic, and chemical product packaging. Flexible packaging technologies use foil, metallized films, and high-barrier transparent films. Flexible food packaging materials are preferred materials for devices of the invention. These materials can provide optical transparency and moisture vapor transmission rates of less than 0.2 g/m2 day. Multilayer packaging constructions can provide a good combination of low moisture vapor transmission rates, high optical clarity, and good physical parameters. Combination of properties can be obtained by "sandwiching" different types of barrier films. These constructions can be produced using water-based coatings. Other exemplary materials from known manufacturers include SiOx-coated films, PVDC Latex (W.R. Grace), Ceramis (Alcan), Aclar (Honeywell), PET (Sheldahl), and PET (Dupont).

Those experienced in the field will understand that material thickness is an important variable in device construction and that varying degrees of flexibility and handling are associated with each material type. Further, those experienced will understand the compatibilities issues that exist between device components and the agents contained by the device. Furthermore, those experienced in the field will understand the ability to sterilize both the contents of the device as well as the external surfaces. Those experienced in the field will further understand the film characteristics required for direct printing on film surfaces as well as the use of adhesives in the use of labels applied to film surfaces. Common print methods include gravure, inkjet, and flexographic techniques.

Device films are mated with molded parts using sonic welding, heat treatments, the application of adhesives, or the like. Device compartments are created using pressure sensitive barriers generated with device films and components. Welding, heat, adhesives, or a combination thereof, are used to place pressure sensitive barriers. Those experienced in the art will understand the temperatures and times associated with the sealing of devices and the types and varieties of high speed equipment available to form the device, load the device, and seal the devices. Additionally, printing on the devices is readily completed and those experienced in the art will understand the printing and labeling requirements associated with the different film and device materials as well as available equipment for completing the printing operation.

Molded components used with the invention include tubes, bottles and hybrid tube bottle systems often called tottles that provide flexible conical shaped devices. Likewise, flexible packaging combined with molded components can allow for more than one conical shaped element for operation. Molded components include resealable elements such as caps and closures. These caps and closures can be incorporated with standard sizes. Exemplary sizes include neck finishes such as 18-410, 20-410, 24-410, 24-415, 28-400, 28-410, 28-415, 13 mm, 24 mm, 28 mm, 15-400, 15-410, 20-400, and 22-400.

Caps can be dispensing or non-dispensing. Exemplary caps include disc-top, spout-top, and snap tops. Caps can be prepared with a wide variety of materials including phenolic resins, polypropylene, LD polyethylene, MD polyethylene, HD polyethylene, polyvinyl chloride, polyethylene terephthalate, glycol modified polyethylene terephthalate, polycarbonate, cyclo-olefin copolymer, nylon 6, polyethylene naphthalate, and polystyrene. Those expert in the field will understand the typical properties of these materials and their suitability for storing, hatching, and culturing aquatic organisms of the invention. Dispensing caps can also include pumps with varying length tubing. Dosing caps based upon stop-cock designs are exemplary components of the invention. Caps can be prepared in a range of colors and shapes including round, oval, rectangular and large enough to support liquid filled vessels. Further caps can have a large variation in thread count and styles as well as incorporating orifice reducers. Twist top caps for precise liquid dispensing are exemplary as are caps with built in sifters or with defined pore structures. Caps may be further modified with shrink bands for indicating tampering as well as child safety and child resistant designs.

Aquatic and Semi-Aquatic Organisms:

Small aquatic and semi-aquatic organisms are preferred components of the invention. Exemplary organisms include those found in freshwater, brackish, and marine environments. There are many known and categorized organisms as well as yet unknown species from these and other moist environments. Exemplary organisms include brine shrimp (artemia) invertebrates, daphnia, moina, rotifers, diatoms, copepods, worms, nematodes, protozoa, infusoria, insect larvae, yeast, bacteria, mold, algae, zooplankton, triops, and phytoplankton.

Copepods are an exemplary class of animal that belong to the larger group of animals called Crustacea. It is reported that there are more than ten thousand species of copepods. Three major categories are commonly discussed and include Calanoida, cyclopoida, and Harpacticoida. Additional crustaceans include water fleas such as daphnia and moina.

Preferred organisms include *Artemia salina*, also known as just *Artemia* or brine shrimp. These organisms are cultured and hatched throughout the world and are well known in all aspects of commercial and hobbyist aquaculture. Two of the most prolific geographic locations are the salt flats of San Francisco Bay and the Great Salt Lake in Utah. New strains of the organism are being found and cultured. Currently there are more than 50 known strains. Additional preferred organisms include those from the phylum Rotifera, which consists of three classes and approximately 2000 described species. Preferred rotifers include *brachionus plicatilis* and those known as L and S strains, and *brachionus calyciflorus*.

Preferred organisms include algal classes such as Bacillariophyceae, Chlorophycea, Chrysophyceae, Cryptophyceae, Cyanophyceae, Dinophyceae, Euglenophyceae, Eustigmatophyceae, Prasinophyceae, Pymnesiophyceae, and Xanthophyceae. Preferred phytoplankton includes *Isochrysis galbana, isochrysisgalbana* Tahiti strain, *Nannochloropsis oculata, tetraselmis chuii, nannochlorus, chaetoceros gracilis, chlorella, dunaliella*. Preferred organisms also include, cyanobacteria such as *spirulina, pavlova lutheri, pavlova viridis, thalassiosira weissflogii*, and *amphora, skeletonema costatum, phaeodactylum tricornutum, tetraselmis suecica, bellerochia spinifera, chaetoceros simplex, thalassiosirea pseudomonas, Nitzschia, chlamydomonas*. Algal species may be included in devices of the invention in concentrated liquids, dilute liquids, and on solid substrates which provide slow, medium, or fast growth nutritional media. Medias can be formulated with a single missing nutrient, which when applied provides for a fully functional media.

Preferred organisms also include triops or tadpole shrimps which belong to the order Notostraca. At least nine different species exist, globally and includes *triops cancriformis* and *triops longicaudatus*.

Preferred organisms include worms such as tubifex, black worms (*Lumbriculus variegates*), red worms, blood worms (midge larvae), meal worms, wax worms, white worms, microworms (nematodes), grindal worms (nematodes) and vinegar eels.

Preferred organisms also include infusoria cultures which often consist of a complex mixture of organisms including protozoa, ciliates, algae, and bacteria. Organism identities are dependent upon collection source and conditions.

Preferred organisms include insect larvae such as red, white, and black mosquito larvae, fruit fly larvae, flies, and fly species that are wingless, or have limited flying ability.

Experts in several relevant fields will recognize and understand which organisms yield live and dormant eggs and the conditions in which both occur. Further experts in the field will understand how to store, preserve, hatch, propagate, and culture different forms of each organism. Furthermore, experts in the field will understand the life cycles and development stages of each organism and associated size and understand the appropriate device parameters including organism density and device volume required for successful revival, feeding, and propagation of the organism. Additionally, experts in the field will understand the food sources for each organism and each development stage and will understand how to include the food source in the device in an appropriate form.

Hatching, Propagation and Culture Solutions:

General hatching, propagation, culture solutions, and the like for different species are widely known and are often optimized or tailored for specific organisms. Culture and propagation of algae, bacteria, and phytoplanktons are widely known and depend upon species. Solutions and conditions for reviving and increasing the metabolism of species in a reduced activity state are also highly organism dependent and often involve both chemical and physical parameters. Solutions are often tailored to simulate the natural environment of the organism. Culture and propagation solutions for algae, bacteria, and phytoplanktons, utilize a range of different solutions and media concentrations and are tailored for desired culture densities, and final target application.

Common dissolved solids present in hatching, propagation, and culture medias include organic and inorganic salts based upon chlorides, phosphates, carbonates, sulfates, oxides, citrates, acetates, and weak acids. Further, acids, bases, and buffers are commonly incorporated into solutions as are nitrogen, sulfur, phosphorus, silicate, and organic carbon sources. In general, soluble sources of the following elements are required: nitrogen phosphorus, potassium, boron, manganese, magnesium, copper, iron, molybdium chloride, calcium, and sulfur at some level. Trace elements such as metals, metal oxides, and chelates are commonly used. Additionally, vitamins, carbonates, bicarbonates, and simple and complex organics are used.

Published solution compositions include Guillard's medium(s) such as F/2 and other variations. Typical reagents include sodium nitrate, sodium hydrogen phosphate, iron edta, manganese chloride, cobalt chloride, copper sulfate, zinc sulfate, sodium silicate, sodium molybdate, vitamin B12, biotin, thiamin, seawater, distilled water, ion exchange water, sodium glycerophosphate, sodium edta, iron ammonium sulfate, boric acid, iron chloride, and zinc chloride. Culture mediums can contain complex organic mixtures including cornmeal, yeast pastes, pablum, oatmeal, and egg yolks.

Mixed organism cultures are commonly used to culture species such as daphnia, monia, copepods, and rotifers. Those experienced in the art will understand how to design and tailor culture conditions for these systems.

Additional Reagents:

Oxidizers are useful for treating culture and hatching system components and commonly include hypochlorites, percarbonates, persulfates, and peroxides. Peroxides have been noted to provide benefits during the hatching of certain organisms in resting egg form. Additionally, reagents that release oxygen overtime are beneficial as oxygen release serves many purposes in devices of the invention. As example oxygen gas releasing solids may be used to oxygenate, mix, and suspend culture system components as bubbles are released. Dechlorinating agents such as thiosulfates are useful for neutralizing chlorine and other oxidizers that have been included in hatch solutions or cleaning procedures. A preferred agent is sodium hydroxymethanesulfonate which can be used in significant concentrations to neutralize oxidizers and to detoxify ammonia.

Waste scavengers in both solid and liquid form are highly beneficial. Waste scavengers include particulates which are ammonia adsorbers, organic adsorbers, as well as ion exchange materials which function through adsorption and absorption phenomena. Adsorption and absorption materials can be organic or inorganic based. Waste neutralization agents can also be soluble and include chelating reagents based upon weak acids and bases. Preferred agents adsorb ammonia and nitrogen wastes, heavy metals such as copper and zinc, and organics such as those released during the hatching processes. Waste treatment reagents can be added at anytime during the hatching or culture of the organisms. Optimum times for addition are determine by the species and culture system.

In addition to scavenging waste components, particulate material can support beneficial bacteria for nitrogen waste conversion and serve to visually enhance a device, by providing a substratum. Aquariums and children's educational and entertainment devices such as those commonly known as Sea Monkeys, and Triops often include substrates for visual effect. Exemplary substrates include those currently used with freshwater and marine aquaria. Preferred substrates are natural and colored sand, silicas, glass, small river rocks, and finely ground carbonate minerals including calcium carbonates and magnesium carbonates and combinations thereof.

Manipulation and Exposure of Devices:

Devices of the invention function efficiently with simple external temperature control, lighting and illumination, and aeration equipment. Standard equipment for providing lighting includes incandescent, metal halide, diode, halogen, and fluorescent sources. Device efficiencies are such that desk lamps and low wattage night-lights can provide sufficient light for some hatching and culture procedures. Those experienced in the art will understand the color spectrum and intensity differences between different light sources as well as the need for filtering unwanted frequencies. Experts in the field will understand the heat generation characteristics of light sources and the mechanisms required to control the temperature of illuminated devices.

The temperature of devices can be controlled using a wide variety of different mechanisms including, thermoelectric devices, light source frequency, intensity, and position, as well as fans, air circulation systems, and water or fluid bath systems. Preferred methods of controlling temperature with devices of the invention include positioning light sources, manipulating air circulation, and using portable heating and cooling devices such as cold packs and heat packs. Devices of the invention, as a result of their compact size and use of thin films, can utilize a wide range of temperature control mechanisms. As example, a device of the invention may be placed into a vessel such as a drinking glass or cup and ice, chilled liquid, or a combination thereof, added. The amount and positioning of the ice or liquid with respect to the device allows temperatures to be reduced. Likewise, placing a device inside a small vessel such as a drinking glass or mug and then placing the glass or mug on a cold pack will aid in reducing the temperature of the system. Likewise hot or heat packs can increase device temperatures.

Aeration equipment widely available and suitable for device operation includes air blowers, compressed gas systems, and fluid circulation pumps. Those experienced in the art will understand flow rates and limitations to organism viability based upon set up parameters. Many devices of the invention require only simple, inexpensive air generators in the form of air pumps. Additional equipment used with air pumps include solid and rigid air tubing, air diffusers, valves, manifolds, and bubblers created with a wide variety of porous materials. Those experienced in the art will understand the advantages and disadvantages of various materials and equipment setups.

Devices of the invention can use a variety of mixing apparatus to mix and suspend culture system components. A preferred mechanism for mixing and suspension of components in compact devices of the invention involves use of air pumps, flexible air line tubing and rigid air line tubing.

Other external components can be used with devices of the invention and provide significant utility. Exemplary systems include pressure clips and restrictive band which provide reversible liquid and in some cases air tight seals. Since many organisms are sensitive to light, light controlling materials made from woven or nonwoven textiles are highly useful. Both of these external components aid the operator of the devices in isolating and separating culture system components.

Devices of the invention which are prepared with thin films allow contents to be separated into different spatial locations using pressure clips which compress the front and back sides of the device. This is useful for instance in separating *Artemia nauplii* from empty cysts, and from unhatched cysts and removing them from the device.

Similarly, *Artemia nauplii* as well as other organisms demonstrate phototactic characteristics and thus by blocking light to one section of a device, organisms move towards locations in the device which are exposed to light. Use of an external pressure clip in combination with light blocking materials allows separation of phototactic organisms.

Further, external pressure clips that provide a reversible liquid and airtight seal for the device allow the device to be closed and positioned flat on a surface, placed in a refrigerator for short term storage or frozen for long term storage. Exemplary clips include plastic clips, spring containing clips, metal tension clips, magnetic clips, magnet containing clips, and combinations thereof. Preferred pressure clips which provide liquid tight seals include those carrying the brand names WeLoc and Twixit. These clips are available in polypropylene and polyamide forms. Additional items with great utility include transparent supports for devices of the invention. These supports can include glass and plastic structures. Preferred materials include acrylic, glass, polycarbonate, and polystyrene. Exemplary supports include drinking glasses of all shapes and sizes as well as brochure and file display type containers. Brochure holders modified with airline holes are exemplary means of working with multiple devices.

Printing, Device Markings, and Indicators

Preferred devices of the invention include printed elements that provide significant utility to the device operator. Preferred devices use specialty dyes and inks. Printing in the form of writing, pictures, textured elements, or a combination thereof can be applied directly to device surfaces or indirectly through the printing of labels and subsequently adhesion of the labels to the device surface. Printing can also affect device function by controlling light, temperature, and positioning. Devices support general marketing and product identification text as well as instructions for device use. Instructions can be in the form of text, pictures, diagrams, and combinations thereof. Further simple printed markings allow device operators to accurately and precisely measure device volume contents and volumetric additions to the device. This information increases the probability of hatching and culture success by simplifying device operation.

Further, printing technology can be used to provide a wide variety of important hatching and culture system information visually to the operator, including temperature, lighting levels, chemical concentrations, and organism density information. Exemplary indicator systems include those created with printing and coating technology. Exemplary indicator technologies include thermochromics, which provide temperature information through color changes, photochromics which provide lighting and illumination information through color change, and chemochromics, which provide chemical information through color change. Exemplary thermochromic technology utilizes liquid crystals, leucodyes, and combinations thereof. Exemplary photochromic technologies use dyes. Exemplary chemochromic technologies use a range of organic and inorganic compounds which include dyes, pigments, carriers, and combinations thereof.

Simple printing designs can provide a no-loss mechanism for determining organism hatch numbers as well as cell and organism densities present inside devices as a function of time. Example designs include simple grids with controlled line organizations. Grids used with magnifying optics allow organisms per unit square or other geometric design to be counted. Information provided for the total number of geometric units allows calculation of organism numbers. The use of thin transparent films allows high magnifications and standard microscopic viewing equipment to be used. Likewise, secchi disk type patterns may be printed directly on devices. These optical indicators allow organism densities to be rapidly determined.

DETAILED DESCRIPTION OF FIGURES

FIG. 1.

FIG. 1 illustrates one embodiment of the invention, a view of the front face of a conical thin film device made from transparent and semi-opaque polymer films which are permanently heat sealed around the periphery, (1); containing one organism storage compartment (2) one optional nutrient compartment (3), each with a pressure sensitive barrier (4); and one conical mixing, suspension, and illumination compartment (5). Hatching, propagation or culture solutions may be contained in the mixing compartment (5). The device integrates a hatching cone (6) into the conical mixing compartment (5) which fits a rigid air tube (10). The device incorporates markings (7) for opening and resealing the device using cutting, or tearing, or resealable elements. Mounting holes (8) are provided for mounting during hatching or culture or for preparing for use with a lanyard which allows transport and display. An optional molded precision delivery connector (9) is indicated at the bottom of the hatching cone. An external light source (12) provides illumination through the transparent window of the device (1). A printed grid (13) on the device package allows estimation of organism number density in the device. Volumetric markings (14) allow removal and introduction of liquids and solids in a accurate and precise manner. FIG. 1, illustrates additional external equipment used with the device in the form of a light blocking sheath which fits over the device (15) and a pressure clip (16), which provides a liquid tight seal anywhere across the device.

FIG. 2.

Figure 2:
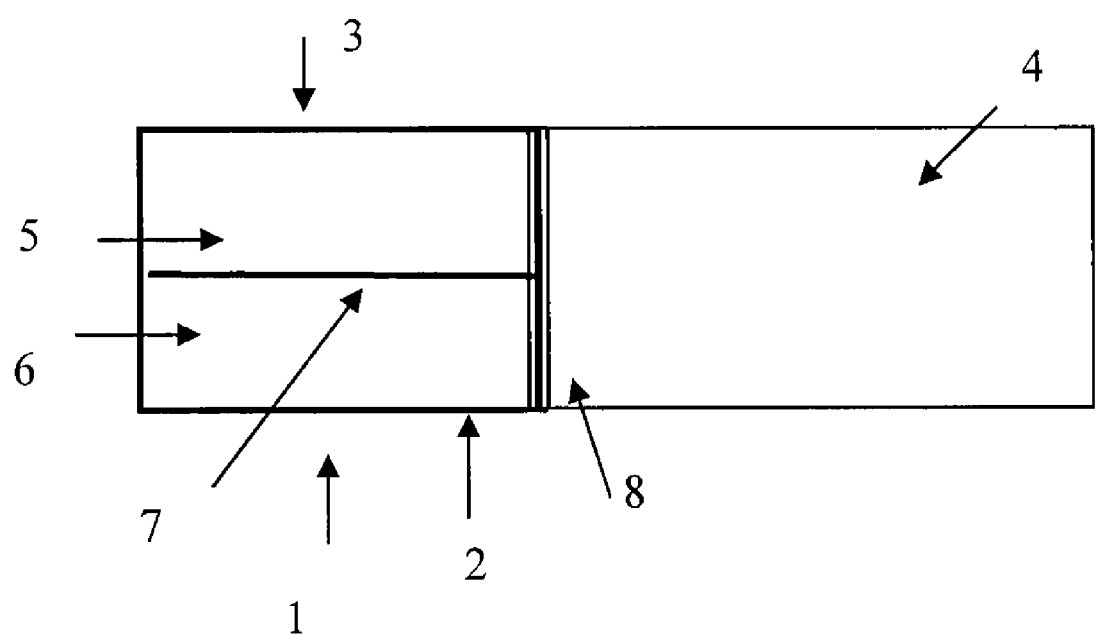
FIG. 2, a side view, illustrates a similar embodiment of the invention illustrated in FIG. 1, a device made from transparent flexible materials, incorporating three hatching-culture system storage compartments, and one mixing and illumination compartment. The compartments are prepared using three laminated polymer sheets.
Figure 3:
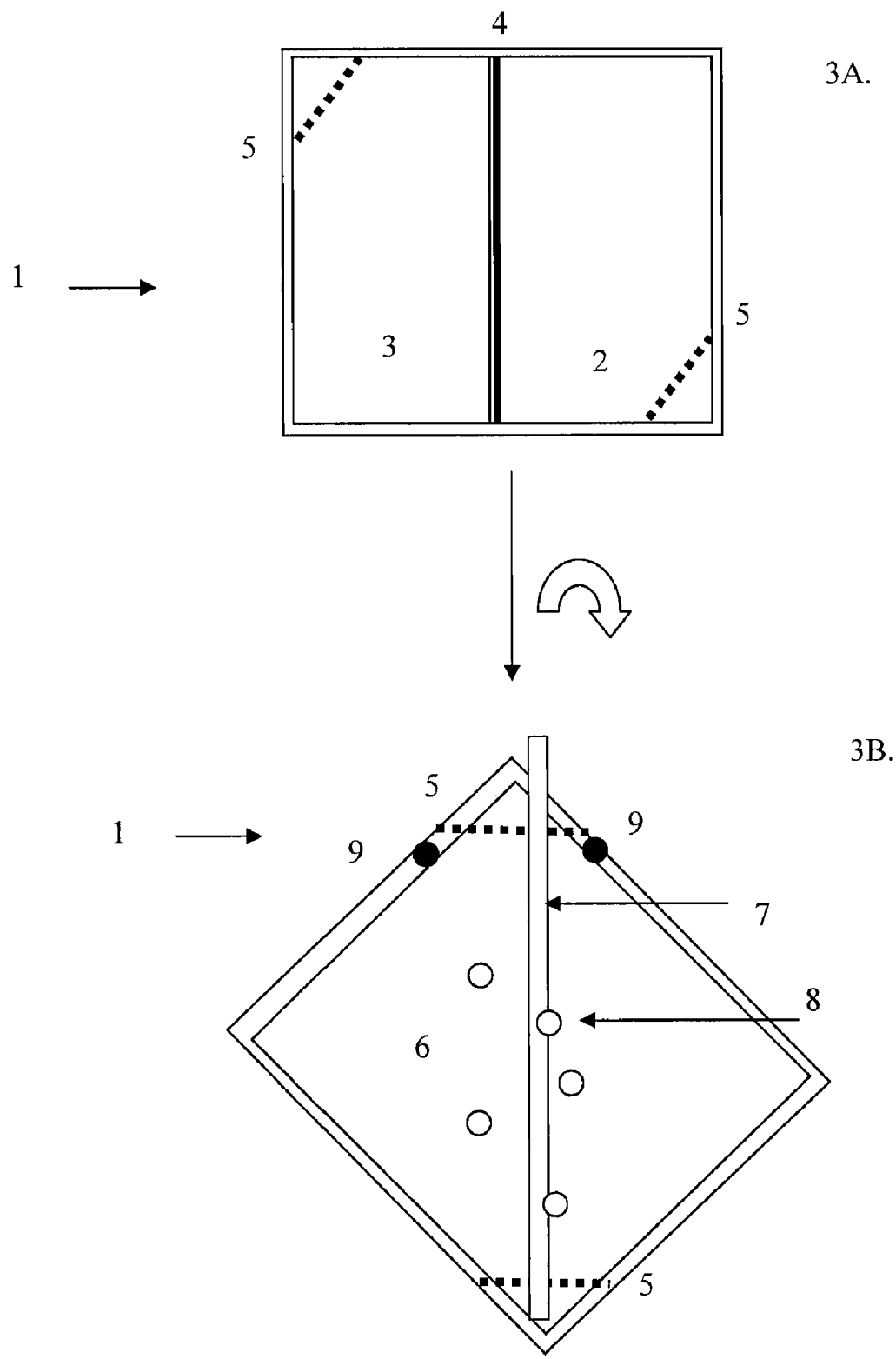
FIGS. 3A and 3B, top views, illustrate one embodiment of the invention, a device made from transparent flexible materials, incorporating two culture system storage compartments, and one mixing and illumination compartment. The compartments are prepared using two laminated polymer sheets and a pressure sensitive barrier created between the sheets.

FIG. 2 illustrates one embodiment of the invention, a side view, cut-away of the device illustrated in FIG. 1, a device formed with transparent and semi-opaque polymer films which are permanently heat sealed around the periphery, (1). Top film (3) is transparent while bottom film (2) is semi-opaque, reflective, transparent or a combination thereof. Organism storage chamber (5) and optional nutrient storage chamber (6) are prepared with a common barrier film (7) and pressure sensitive barriers (8). A mixing, suspension, dilution, and illumination compartment (4) is provided. Compartment (4) is conical shaped. The device contains all of the printed markings illustrated in FIG. 1.

FIGS. 3A and 3B.

FIG. 3A illustrates one embodiment of the invention, a view of the front face of a device formed with transparent and semi-opaque polymer films which are permanently heat sealed around the periphery, and in the geometry of a square (1); containing one organism storage compartment (2) and one culture solution compartment (3). Storage compartments (2 and 3) are separated by a pressure sensitive barrier (4). The device contains marking positions (5) for opening and resealing the device using cutting, or tearing, or optional resealable elements. FIG. 3B, illustrates the device in a rotated position. Rotation creates a conical shaped compartment (6) after the pressure sensitive barrier (4) is breached. In this view of the device, markings are present at positions (5) for opening and resealing the device using cutting, or tearing, or resealable elements. Mounting holes (9) are provided for hanging, mounting and positioning the device. A rigid air tube (7) is positioned into the bottom of the cone (corner of the device) where air bubbles (8) mix, suspend, and aerate the system.

FIG. 4.

Figure 4:
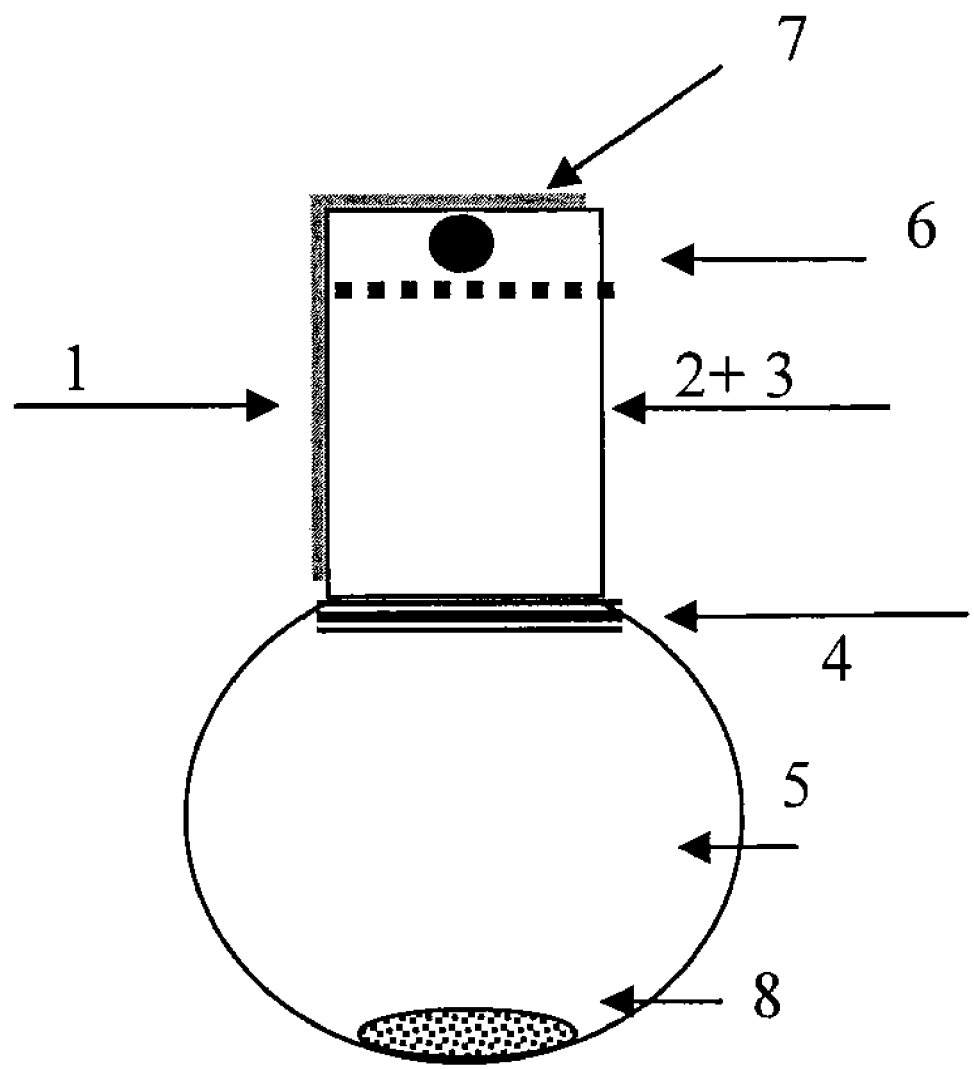
FIG. 4, a front view, illustrates one embodiment of the invention, a device made from transparent flexible material, incorporating two hatching-culture system storage compartments, and one mixing and illumination compartment. The compartments are prepared using two or three laminated polymer sheets and pressure sensitive barriers.

FIG. 4 illustrates one embodiment of the invention, a view of the front face of a device made from transparent and semi-opaque polymer films which are permanently heat sealed around the periphery, (1); containing one organism storage compartment (2) one optional nutrient compartment (3), each with a pressure sensitive barrier (4); one spherical mixing, suspension, and illumination compartment (5). Culture solution may be contained in the mixing compartment (5). The device accepts a rigid air tube, not shown for clarity. The device incorporates marking positions (6) for opening and resealing the device using cutting, or tearing, or resealable elements. A mounting hole (7) is provided for mounting during hatching or culture or for preparing as a lanyard for transport and display. The culture and mixing compartment (5), may also contain a solid substrate (8), such as sand, stone, or a zeolite, for treating wastes and enhancing aesthetics.

FIG. 5.

Figure 5:
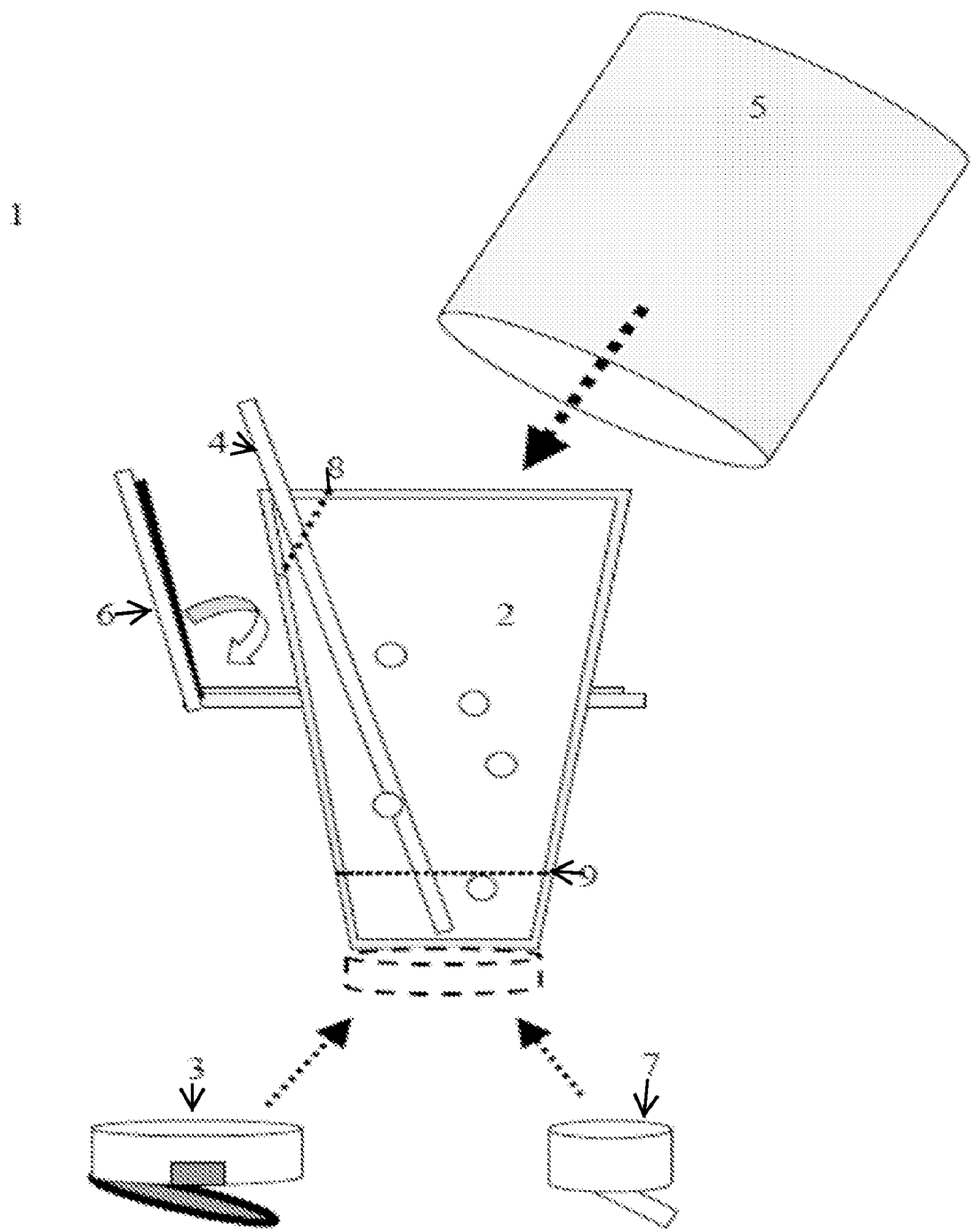
FIG. 5, a front view, illustrates one embodiment of the invention, a conical shaped device made from transparent or translucent flexible material, incorporating a single storage, mixing, and illumination compartment. Molded plastic cap (3) and molded precision delivery connector (7) may be placed on the device at the position shown. Light blocking sheath (5) may be placed over the device to block light, and pressure clip (6) may be used to provide a liquid tight seal anywhere across the device.

FIG. 5 illustrates one embodiment of the invention, a view of the front face of a device made from transparent or semi-opaque polymer films which are permanently heat sealed around the periphery, (1). The device incorporates a molded plastic cap (3) which serves as a resealable opening, a delivery mechanism, and a means for supporting the device upright under a lighting source. The device would be classified as a hybrid tube-bottle system or a tottle. The device (1) contains a single combination organism storage, conical mixing, suspension, and illumination compartment (2) in a conical shape. Some but not all of the culture components may be contained in the single compartment (2). The device utilizes a predesigned opening (8) which accepts a rigid air tube (4). An optional molded precision delivery connector (7) is provided as a delivery mechanism for hatched or culture organisms. Volumetric markings (9) allow reproducible removal and introduction of liquids and solids. FIG. 5, also illustrates a light blocking sheath (5) and a pressure clip (6), which are to be used with the device.

FIG. 6.

Figure 6:
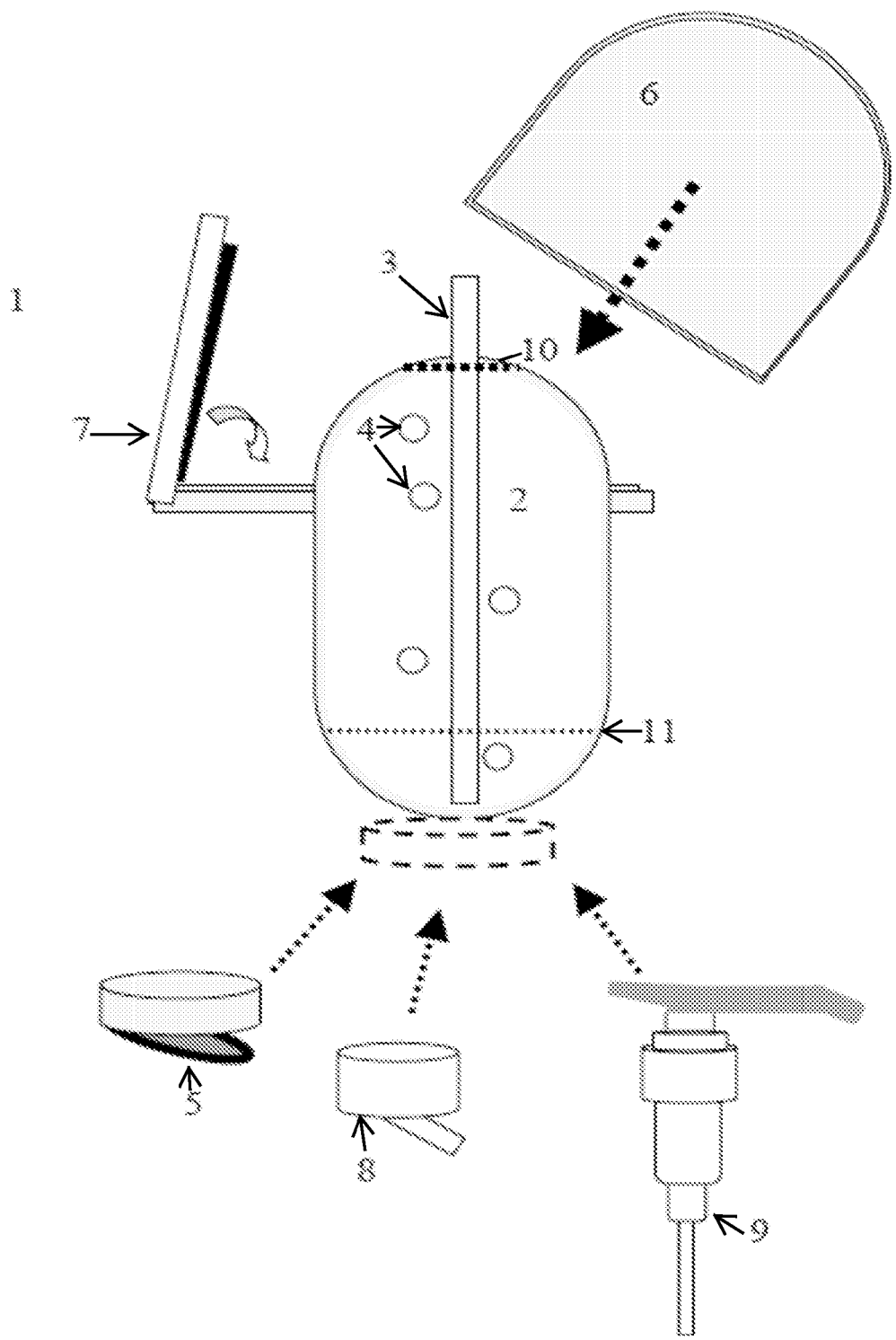
FIG. 6, a front view, illustrates one embodiment of the invention, a conical shaped device made from transparent or translucent flexible material, incorporating a single storage, mixing, and illumination compartment. Molded plastic cap (5) and molded precision delivery components (8) and (9) may be placed on the device at the position shown. Light blocking sheath (6) may be placed over the device to block light, and pressure clip (7) may be used to provide a liquid tight seal anywhere across the device as shown. The device is free standing supported by a dispensing cap.

FIG. 6 illustrates one embodiment of the invention, a view of the front face of a device made from transparent or semi-opaque polymer films which are permanently heat sealed around the periphery, (1). The device incorporates a molded plastic cap (5) which serves as a resealable opening, a delivery mechanism, and a mechanism for supporting the device upright under a lighting source. The device would be classified as a hybrid tube-bottle system or a tottle, in a "Malibu" shape. The device (1) contains a single combination organism storage, conical mixing, suspension, and illumination compartment (2) in a conical shape. Some but not all of the culture components may be contained in the single compartment (2). The device utilizes a predesigned opening (10) which fits a rigid air tube (3). Air bubbles (4) provide mixing and suspension of culture components. Optional molded precision delivery components (8 and 9) are provided as a delivery mechanism for hatched or culture organisms. Volumetric markings (11) allow reproducible removal and introduction of liquids and solids. FIG. 6, also illustrates a light blocking material sheath (6) and a pressure clip (7), to be used with the device.

FIG. 7.

Figure 7:
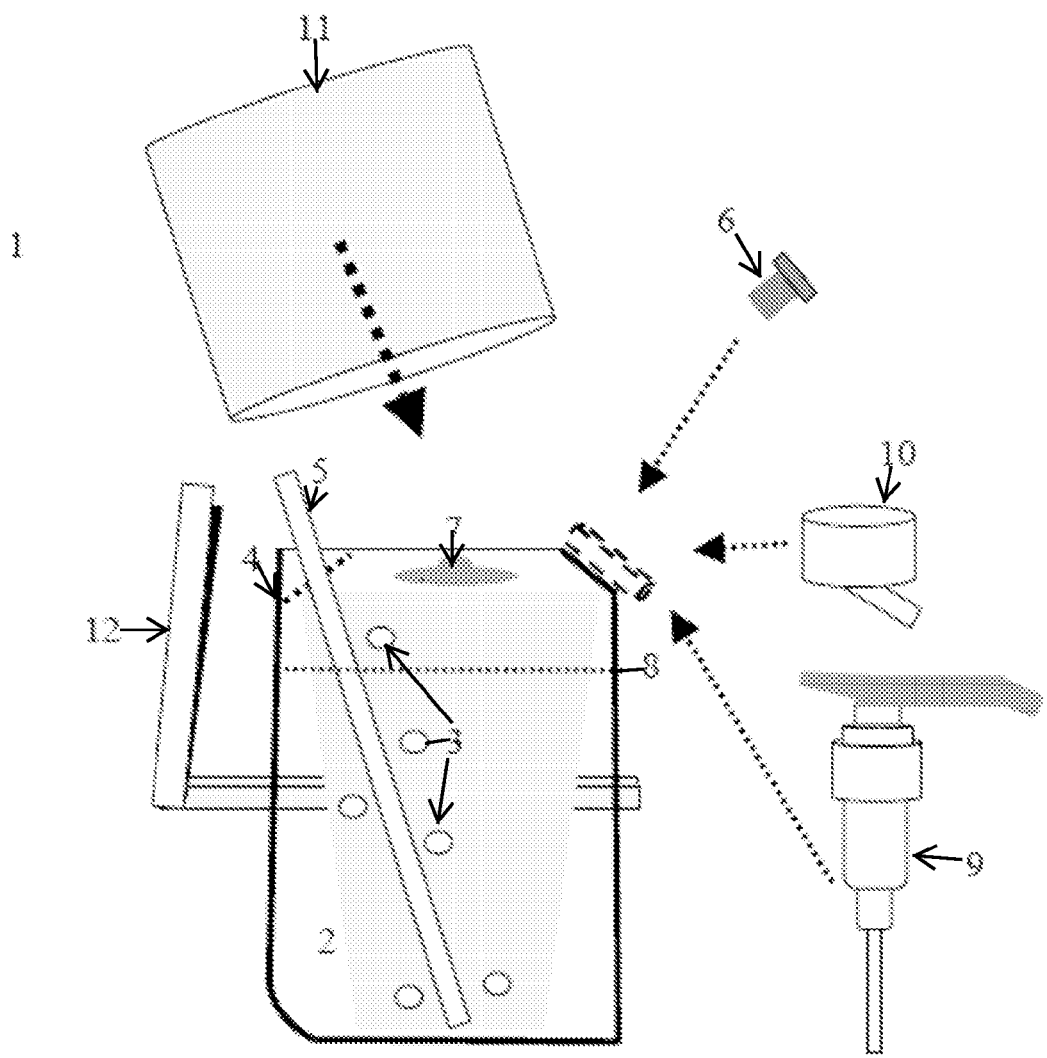
FIG. 7, a front view, illustrates one embodiment of the invention, a free standing flexible pouch-shaped device containing a conical shaped inner container, supporting storage, mixing, and illumination of system components. The device is free standing supported by a dispensing cap. Molded plastic cap (6) and molded precision delivery components (9) and (10) may be placed on the device in the position shown. Light blocking sheath (11) may be placed over the device to block light, and pressure clip (12) may be used to provide a liquid tight seal anywhere across the device as shown.
Figure 8:
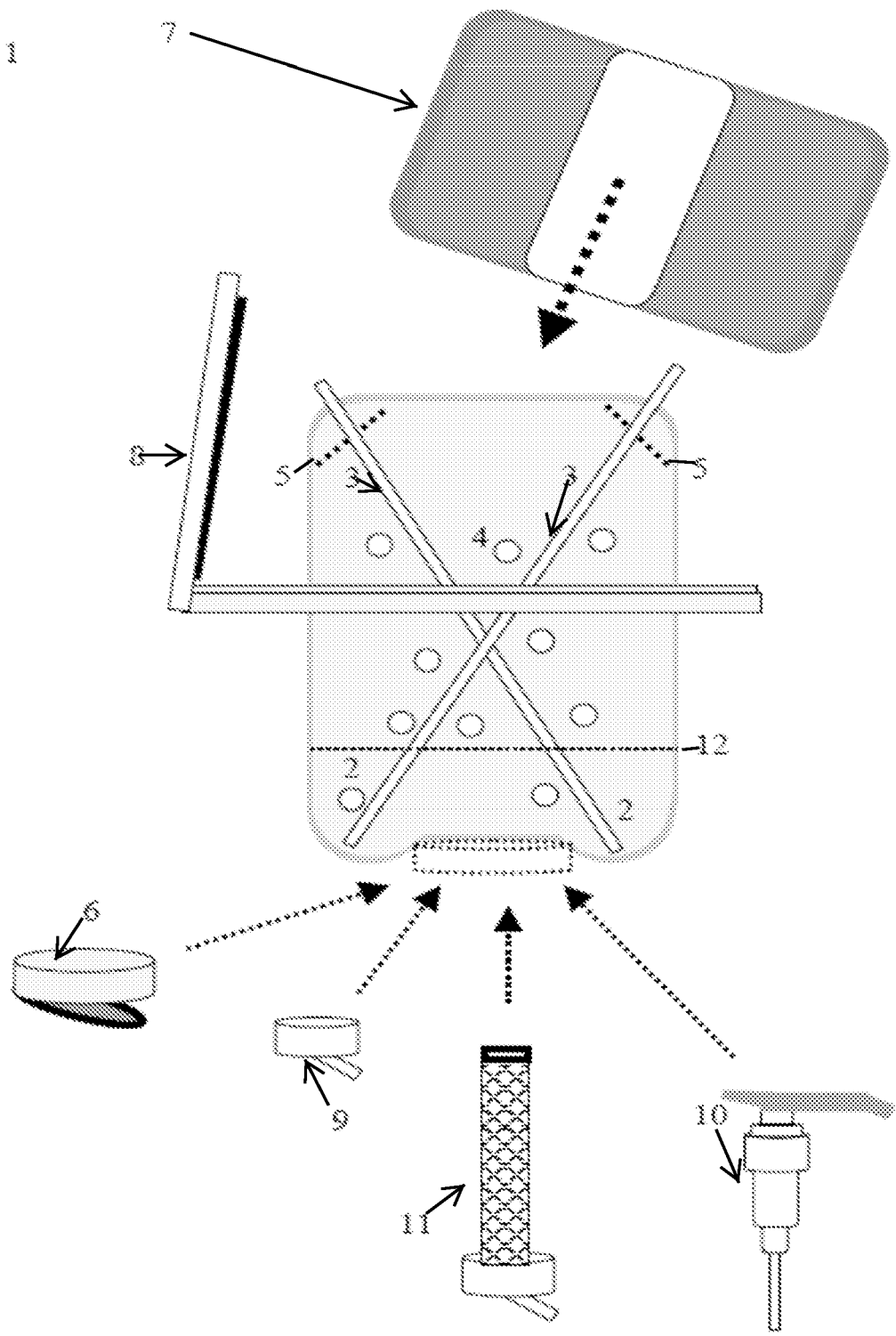
FIG. 8, a front view, illustrates one embodiment of the invention, a free standing flexible pouch-shaped device containing a conical shaped inner container, supporting storage, mixing, and illumination of system components. The device is free standing supported by a dispensing cap. Molded plastic cap (6) and molded precision delivery components (9), (10), and (11) may be placed on the device at the position shown. Light blocking sheath (7) with a light transmission window may be placed over the device, and pressure clip (8) may be used to provide a liquid tight seal anywhere across the device as shown.

FIG. 7 illustrates one embodiment of the invention, a view of the front face of a device made from transparent and semi-opaque polymer films which are permanently heat sealed around the periphery, (1). The device incorporates a molded plastic cap (6) which serves as a re-sealable opening and a deliver mechanism for the device. The device would be classified as a pouch system with a "K" type bottom. The device (1) contains a single combination organism storage, conical mixing, suspension, and illumination compartment (2) in a conical shape inside the device. The pouch is designed to allow stable upright self-supported positioning under a lighting source. Some but not all of the culture components may be contained in the single compartment (2). The device utilizes a pre-designed opening (4) which accepts a rigid air tube (5). Optionally, the air tube may be inserted through the resealable cap (6). Air bubbles (3) provide mixing and suspension of culture components. Volumetric markings (8) allow reproducible removal and introduction of liquids and solids. An optional mounting hole (7) is provided. Optional molded precision delivery components (9 and 10) are provided as a delivery mechanism for hatched or culture organisms. FIG. 7, also illustrates a light blocking material sheath (11) and a pressure clip (12), to be used with the device. FIG. 8.

FIG. 8 illustrates one embodiment of the invention, a view of the front face of a device made from transparent and semi-opaque polymer films which are permanently heat sealed around the periphery, (1). The device incorporates a molded plastic cap (6) which serves as a resealable opening, a delivery mechanism, and a means for supporting the device upright under a lighting source. The device would be classified as a hybrid pouch-bottle-tube system. The device (1) contains a single combination organism storage, suspension, and illumination compartment (4). Some but not all of the culture components may be contained in the single compartment (4). The device contains two conical shaped design elements (2). The device utilizes pre-designed openings (5) which fit rigid air tubes (3). Volumetric markings (12) allow reproducible removal and introduction of liquids and solids. FIG. 8, also illustrates a light blocking sheath (7) with light transmission window and a pressure clip (8), to be used with the device. Optional molded precision delivery components (9 and 10) are provided as a delivery mechanism for hatched or culture organisms. Optional molded precision delivery components (11) with a culture component separation tube are provided as a delivery mechanism for hatched or culture organisms.

Specific Use and Preferred Embodiments

Exemplary and preferred embodiments of the invention are described in the following Examples. These Examples while illustrative are not meant to be fully descriptive of the utility and functionality of devices and methods of the invention. Devices can be scaled and sized to meet the requirements of many different specific applications. Those experienced in the relevant art associated with each of these Examples will understand the size of devices and concentrations of agents required to successfully address the hatching or culture application. Likewise, those experienced in the relevant art will understand the physical lighting and temperature parameters appropriate for each organism described and the inherent compatibilities of the materials, devices, and combinations thereof.

EXAMPLES

Example 1

San Francisco Bay brand brine shrimp cysts (resting eggs) were placed in one of two storage compartments in a device similar to that illustrated in FIG. 1. Approximately 30 mLs of a brine shrimp hatching solution was placed in the illumination-mixing compartment. The device was sealed and stored at room temperature. The culture system components were separated in this device by a pressure sensitive barrier. When this barrier was breached by squeezing the device, brine shrimp eggs and hatching solution mixed in the sealed device. After 60 minutes, the device was opened by cutting off the top (opposite the conical compartment) and an airline and rigid air tube inserted. The device with air tube was placed in a transparent beverage glass under a desk lamp with an incandescent bulb. The lamp was positioned to maintain a device temperature between 75 F. and 85 F. Hatching of cysts began at 12 hours. The newly hatched brine shrimp were isolated in the device away from the empty egg shells and unhatched eggs through the use of external WeLoc pressure clips. The brine shrimp were subsequently rinsed with fresh hatching solution and then fed with a commercial nutrient solution containing single cell algae and a microemulsion of fatty acids. After feeding, the device was sealed through use of a pressure clip and stored in a refrigerator.

Example 2

OSI brine shrimp cysts (resting eggs) were placed in one of two storage compartments in a device similar to that illustrated in FIG. 1. Approximately 30 mLs of a brine shrimp hatching solution was placed in the illumination-mixing compartment. The device was sealed and stored at room temperature. The culture system components were separated in this device by a pressure sensitive barrier. When the barrier was breached by squeezing the device, the eggs and hatching solution mixed in the sealed device. After 60 minutes, the device was opened by cutting off the top (opposite the conical compartment) and an airline with a rigid air tube inserted. The device with air tube was placed in a transparent beverage glass under a desk lamp with an incandescent bulb. The lamp was positioned to maintain a device temperature between 75 F. and 85 F. Hatching of cysts began at 12 hours. The newly hatched brine shrimp were isolated in the device away from the empty egg shells and unhatched eggs through the use of WeLoc pressure clips. The brine shrimp were subsequently rinsed with a fresh hatching solution and then fed with a commercial nutrient solution containing single cell algae and a microemulsion of fatty acids. After feeding, the device was sealed through use of a WeLoc pressure clip and stored in a refrigerator. After 24 hours the device was removed from the refrigerator, and the brine shrimp revived with a 75% solution exchange, aeration, and additional feeding. Treated in this way, the brine shrimp remained viable for more than five days.

Example 3

Commercially available Triops cysts (resting eggs) were placed in one of two storage compartments in a device similar to that illustrated in FIG. 1. Approximately 30 mLs of distilled water was placed in the illumination-mixing compartment. The device was sealed and stored at room temperature. The culture system components were separated in this device by a pressure sensitive barrier. When the barrier was breached by squeezing the device, the eggs and water mixed in the sealed device. The device was placed flat on a counter-top under a desk lamp with an incandescent bulb. The lamp was positioned to maintain a device temperature between 75 F. and 85 F. Hatching of triops cysts occurred within 24 hours. Triops hatchlings were transferred to a one-liter container after 30 hours.

Example 4

San Francisco Bay brand brine shrimp cysts (resting eggs) were placed in one of two storage compartments in a device similar to that illustrated in FIG. 1. Approximately 30 mLs of a brine shrimp hatching solution was placed in the illumination-mixing compartment. The device was sealed and stored at room temperature. The culture system components were separated in this device by a pressure sensitive barrier. When the barrier was breached by squeezing the device, the eggs and hatching solution mixed in the sealed device. After 60 minutes, the device was opened by cutting off the top (opposite the conical compartment) and 10 mLs of sodium hypochlorite (bleach) was added. The device was resealed with a WeLoc pressure clip. The device was rotated by hand to mix the eggs. After the eggs turned orange and sank to the bottom of the package, the decapsulation solution was removed and the decapsulated eggs rinsed and dechlorinated using a solution of sodium thiosulfate. The device, with an airline inserted, was placed in a transparent beverage glass under a desk lamp with an incandescent bulb. The lamp was positioned to maintain a device temperature between 75 F. and 85 F. Hatching of decapsulated cysts began in less than 12 hours.

Example 5

Algae from a freshwater source (2 mLs) was placed into one of two storage compartments in a device similar to that illustrated in FIG. 1. Approximately 30 mLs of a plant nutrient solution was placed in the illumination-mixing compartment. The device was sealed and stored at room temperature. The culture system components were separated in this device by a pressure sensitive barrier. When the barrier was breached by squeezing the device, the algae solution and nutrient solution mixed in the sealed device. After 5 minutes, the device was opened by cutting off the top (opposite the conical compartment) and an airline with rigid airtube introduced. The device with airline was placed in a transparent beverage glass under a desk lamp with an incandescent bulb. The lamp was positioned to maintain a device temperature between 75 F. and 85 F. A dense green opaque solution was obtained after three days.

Example 6

OSI brine shrimp cysts (resting eggs) were placed in 225 cm$^3$ flexible plastic vessel which was self-supported by a filling and delivery cap. The device was similar to that illustrated in FIG. 5. Approximately 150 mLs of a brine shrimp hatching solution was also placed in the vessel. The device was opened by removing an external pressure clip (opposite the conical shape compartment) and an airline with rigid air tube inserted. The device with airline was placed under a desk lamp with an incandescent bulb. The lamp was positioned to maintain a device temperature between 80 F. and 85 F. Hatching of cysts began at 12 hours and was 90% complete by 18 hours. The newly hatched brine shrimp were isolated in the device from the empty egg shells and unhatched eggs through the use of a Twixit pressure clip. The brine shrimp were subsequently rinsed with fresh hatching solution. The brine shrimp were transferred to a vessel containing a cap with deliver post/spout as illustrated in FIG. 5. Delivery of the brine shrimp containing liquid through this cap allowed good separation of brine shrimp nauplii and retention of unhatched brine shrimp eggs.

Example 7

A freshwater worm, California Blackworm, was placed into the illumination compartment in a device similar to that illustrated in FIG. 1. A small piece of the freshwater plant species, Anacharis (*Elodea densa*), and a freshwater snail were also placed into this compartment. Approximately 30 mLs of dechlorinated tap water was also placed in the illumination-mixing compartment. The device remained open (unsealed) and stored at room temperature. After two weeks the worm divided, yielding two worms. After additional time, the two worms each divided yielding four individual worms.

The invention claimed is:

1. An aquaculture device comprising; a plurality of thin polymer films sealed along a peripheral edge to form a liquid impermeable seal and define an interior volume space and a hatching cone on a lower end of the device, wherein the one or more polymer films are further sealed within the interior volume space to form a pressure sensitive barrier extending across the entire width of the device and defining an upper storage compartment and a lower mixing compartment, wherein the storage and mixing compartments share at least one common wall with an exterior wall of the device and wherein the device is adapted to receive an aeration component for insertion into the hatching cone.

2. The aquaculture device of claim 1, wherein the plurality of thin polymer films are a laminate film.

3. The aquaculture device of claim 1, wherein the storage compartment further comprises an additional pressure sensitive liquid impermeable barrier defining an organism storage compartment and a nutrient storage compartment.

4. The aquaculture device of claim 1, wherein the pressure sensitive barriers are formed by thermal sealing of the plurality of thin polymer films.

5. The aquaculture device of claim 1, wherein the pressure sensitive barriers are formed by sealing the two or more thin film polymers with an adhesive.

6. The aquaculture device of claim 1, wherein the storage compartment contains an organism to be hatched and the mixing compartment contains a culture solution.

7. The aquaculture device of claim 1, wherein at least a portion of the common exterior wall of the mixing compartment is a transparent thin polymer film.

8. The aquaculture device of claim 1, further comprising positioning elements, wherein the positioning elements are holes or slots located at an end opposite the mixing compartment for hanging the device in a vertical position, or a two-piece reversible mated locking mechanism for positioning the device in a vertical position, horizontal position, or at an angle.

9. The aquaculture device of claim 1, further comprising a molded component, wherein the molded component is selected from the group consisting of non-dispensing caps, dispensing caps, dispensing disk caps, stop-cock caps, precision orifice caps, precision dropper caps, and combination pump and sealing caps.

10. The aquaculture device of claim 1, further comprising sealing and resealing elements, wherein the sealing and resealing elements are tearing notches and tabs, cut location markings, integrated pressure features, external pressure clips, external restrictive bands, or a combination thereof.

11. The aquaculture device of claim 1, wherein the organism is a resting or dormant organism, or in the form of eggs, resting eggs, cysts, decapsulated cysts, or combinations thereof.

12. The aquaculture device of claim 1, wherein the organism is artemia, shrimp, daphnia, rotifers, triops, moina, copepods, algae, bacteria, virus, protozoa, algae, yeast, cysts, molds, insect larvae, ciliates, infusoria, nematodes, worms, or a combination thereof.

13. The device of claim 1 further comprising printing elements, wherein the printing elements comprise marketing information, purchase information, hatching instructions, culture instructions, disposal instructions, hatching indicators, chemical concentration indicators, physical parameter indicators, temperature indicators, lighting indicators, organism density indicators, or a combination thereof.

14. The device of claim 13, wherein the printing elements comprise liquid crystals, leucodyes, chemically reactive agents, chemical binding agents, grid patterns, or secchi disk patterns.

15. The device of claim 1, wherein the storage compartment is opaque, and the mixing compartment is transparent.

16. The device of claim 1, wherein the storage compartment contains algae, and the mixing compartment contains a culture solution.

* * * * *